United States Patent
Kondou et al.

(12)

(10) Patent No.: US 6,835,781 B2
(45) Date of Patent: Dec. 28, 2004

(54) BLOCK COPOLYMER RUBBER, RESIN MODIFIER, AND RESIN COMPOSITION

(75) Inventors: Katsuhito Kondou, Kawasaki (JP); Hiroaki Matsuda, Kawasaki (JP); Tetsuya Toyoshima, Kawasaki (JP)

(73) Assignee: Zeon Corporation, Tokyo (JP)

( * ) Notice: Subject to any disclaimer, the term of this patent is extended or adjusted under 35 U.S.C. 154(b) by 141 days.

(21) Appl. No.: 10/204,864

(22) PCT Filed: Feb. 23, 2001

(86) PCT No.: PCT/JP01/01341
§ 371 (c)(1),
(2), (4) Date: Aug. 26, 2002

(87) PCT Pub. No.: WO01/62813
PCT Pub. Date: Aug. 30, 2001

(65) Prior Publication Data
US 2003/0023019 A1 Jan. 30, 2003

(30) Foreign Application Priority Data
Feb. 25, 2000 (JP) .................................. 2000-049858

(51) Int. Cl.⁷ .............................................. C08F 297/00
(52) U.S. Cl. .......................... 525/314; 525/98; 525/316
(58) Field of Search ............................ 525/98, 314, 316

(56) References Cited
U.S. PATENT DOCUMENTS 3,030,346 A * 4/1962 Cooper, Jr. ................. 526/73
4,282,334 A    8/1981 Walter et al.
6,162,873 A * 12/2000 Toyoshima et al. ......... 525/271

FOREIGN PATENT DOCUMENTS

| EP | 0 879 836 A1 | 11/1998 |
|---|---|---|
| EP | 879836 A1 | 11/1998 |
| GB | 1 230 507 | 5/1971 |
| JP | 57030712 A | 2/1982 |
| JP | 57030714 A | 2/1982 |
| JP | 6220141 A | 8/1994 |
| JP | 9278845 A | 10/1997 |
| JP | 09-278845 A | 10/1997 |
| JP | 10-263537 A | 10/1998 |
| JP | 10265537 A | 10/1998 |

* cited by examiner

Primary Examiner—Fred Teskin
(74) Attorney, Agent, or Firm—Birch, Stewart, Kolasch & Birch, LLP

(57) ABSTRACT

An aromatic vinyl-conjugated diene block copolymer rubber comprising 50 to 75% by weight of conjugated diene monomer units and 25 to 50% by weight of aromatic vinyl monomer units, wherein the content of vinyl bond in the conjugated diene monomer units is at least 50% by weight, the ratio of blocked aromatic vinyl in the aromatic vinyl monomer units is at least 70% and the number average molecular weight of the copolymer rubber is in the range of 280,000 to 1,000,000. An aromatic vinyl resin having incorporated therein the aromatic vinyl-conjugated dione block copolymer rubber gives a shaped article having good impact resistance and luster, and characterized in that the luster is thermally stable and the luster varies only to a minimized extent within the shaped article.

11 Claims, No Drawings

BLOCK COPOLYMER RUBBER, RESIN MODIFIER, AND RESIN COMPOSITION

This application is the national phase under 35 U.S.C. § 371 of PCT International Application No. PCT/JP01/01341 which has an International filing date of Feb. 23, 2001, which designated the United States of America.

TECHNICAL FIELD

This invention relates to a novel block copolymer rubber, a modifier for resin comprising the block copolymer rubber as an effective ingredient, a resin composition comprising the modifier for resin, and a process for producing the resin composition.

BACKGROUND ART

High-impact polystyrene resin (HIPS) is a modified polystyrene resin prepared by incorporating a polymer rubber such as a conjugated diene copolymer rubber as a modifier for resin in a polystyrene resin having poor impact resistance to remedy this deficiency. HIPS has good impact resistance, rigidity and processability and therefore it is widely used for electric appliances, business machines, packaging containers, miscellaneous goods and other articles.

In general, when a rubbery modifier for resin is incorporated in polystyrene resin, luster inherently possessed by the polystyrene resin tends to be deteriorated. To minimize deterioration of luster, some proposals have been made. For example, Japanese Examined Patent Publication (JP-B) No. S48-18594 (GB 1,230,507) discloses a method using a modifier for resin, comprising a butadiene-styrene block copolymer containing butadiene units having a vinyl bond content of 5 to 25% by weight. However, a resin composition made by using this modifier has a problem such that the deterioration of luster cannot be reduced to the desired extent and the luster varies within a shaped article. JP-B S60-57443 (U.S. Pat. No. 4,282,334) discloses a process for producing an impact-resistant polystyrene resin by a specific polymerization procedure using a butadiene-styrene block copolymer containing 20 to 55% by weight of styrene as a rubbery modifier. However, a resin composition obtained by this process has a problem such that the impact resistance is insufficient and, when the resin composition is injection-molded, the luster of the resulting molded article varies within the molded article.

Japanese Unexamined Patent Publication (JP-A) No. H6-220141 discloses a method using a modifier for resin, comprising an aromatic vinyl-conjugated diene block copolymer rubber having a vinyl bond content of at least 40% in the conjugated diene units and a molecular weight of 30,000 to 250,000. JP-A S57-30712 and JP-A S57-30714 disclose a method using a modifier for resin, comprising a styrene-butadiene random copolymer having a styrene content of 3 to 30% by weight and a vinyl bond content of at least 60% in the butadiene units. However, the former method has a problem such that the impact resistance of the resulting resin composition is insufficient and the luster thereof is greatly reduced. The latter method has a problem such that, when the resin composition is injection-molded, the luster of the resulting molded article is insufficient and greatly varies within the molded article, and, when a heat load is imposed on the molded article, the luster is greatly reduced.

DISCLOSURE OF THE INVENTION

A primary object of the present invention is to provide an impact-resistant aromatic vinyl resin composition having good impact resistance and luster and especially characterized in that the luster is reduced only to a minor extent even in a high-temperature environment and varies to a minimized extent within a shaped article.

Another object of the present invention is to provide a modifier for resin, used for the production of the above-mentioned impact-resistant aromatic vinyl resin composition.

To achieve the above-mentioned objects, the present inventors made extensive researches, and found that a modifier for resin, comprising an aromatic vinyl-conjugated diene block copolymer rubber having a high vinyl bond content in the conjugated diene monomer units, comprising a specific amount of aromatic vinyl monomer units with a high blocked ratio, and having a specific number average molecular weight gives a resin composition having a well-balanced luster and impact resistance, and further found that the aromatic vinyl-conjugated diene block copolymer rubber is not described in a literature and is novel. Based on these findings, the present invention has been completed.

Thus, in a first aspect of the present invention, there is provided an aromatic vinyl-conjugated diene block copolymer rubber comprising 50 to 75% by weight of conjugated diene monomer units and 25 to 50% by weight of aromatic vinyl monomer units, wherein the content of vinyl bond in the conjugated diene monomer units is at least 50% by weight, the ratio of blocked aromatic vinyl is at least 70% and the number average molecular weight of the copolymer rubber is in the range of 280,000 to 1,000,000.

In a second aspect of the present invention, there is provided a modifier for resin which comprises the above-mentioned block copolymer rubber as an effective ingredient.

In a third aspect of the present invention, there is provided a resin composition comprising 2 to 25% by weight of the above-mentioned block copolymer rubber and 98 to 75% by weight of a resin.

In a fourth aspect of the present invention, there is provided a process for producing a resin composition comprising polymerizing a monomer for forming a resin in the presence of the above-mentioned block copolymer rubber.

BEST MODE FOR CARRYING OUT THE INVENTION

[Block Copolymer Rubber]

The block copolymer rubber of the present invention comprises 50 to 75% by weight of conjugated diene monomer units and 25 to 50% by weight of aromatic vinyl monomer units, wherein the content of a vinyl bond in the conjugated diene monomer units is at least 50% by weight, the ratio of blocked aromatic vinyl is at least 70% and the number average molecular weight of the block copolymer rubber is in the range of 280,000 to 1,000,000.

Conjugated diene monomers used for the production of the above-mentioned block copolymer rubber are not particularly limited, and include, for example, 1,3-butadiene, 2-methyl-1,3-butadiene (isoprene), 2,3-dimethyl-1,3-butadiene and 1,3-pentadiene. These conjugated diene monomers may be used either alone or as a combination of at least two thereof. Of these, 1,3-butadiene and 2-methyl-1,3-butadiene are preferable. 1,3-butadiene is especially preferable.

The content of the conjugated diene monomer units in the block copolymer rubber is such that the lower limit thereof is 50% by weight and preferably 55% by weight, and the upper limit thereof is 75%, preferably 73% by weight and more preferably 65% by weight. When the content of the conjugated diene monomer units is too small, the luster becomes poor. In contrast, when the content of the conjugated diene monomer units is too large, the impact resistance becomes poor.

The content of vinyl bond in the conjugated diene monomer units is such that the lower limit thereof is 50% by weight and preferably 55% by weight, and the upper limit thereof is preferably 90% by weight and more preferably 80% by weight. When the vinyl bond content is too small, the luster tends to be deteriorated, and the luster of an injection-molded article is liable to vary within a molded article. In contrast, when the luster is too large, the impact resistance tends to be reduced. By the term "vinyl bond content" herein used is meant both of the content of 1,2-vinyl bond and the content of 3,4-vinyl bond in the conjugated diene monomer units. Either or both of 1,2-vinyl bond and 3,4-vinyl bond may be present in the conjugated diene monomer units.

Aromatic vinyl monomers used for the production of the above-mentioned block copolymer rubber include, for example, styrene, 2-methylstyrene, 3-methylstyrene, 4-methylstyrene, 2,4-diisopropylstyrene, 2,4-dimethylstyrene, 4-t-butylstyrene and 5-t-butyl-2-methylstyrene. Of these, styrene is preferable.

The content of the aromatic vinyl monomer units in the block copolymer rubber is such that the lower limit thereof Is 25% by weight, preferably 27% by weight and more preferably 35% by weight, and the upper limit thereof is 50% and preferably 45% by weight. When the content of the aromatic vinyl monomer units is too small, the luster is poor. In contrast, when the content of aromatic vinyl monomer units is too large, the impact resistance is poor.

The ratio of blocked aromatic vinyl in the block copolymer rubber of the present invention of the present invention must be at least 70%, and is preferably at least 75% and especially preferably at least 80%. With an increase of the ratio of blocked aromatic vinyl, the luster becomes excellent. If the ratio of blocked aromatic vinyl is lower than 70%, the luster Is reduced.

The ratio of blocked aromatic vinyl is measured by the osmium oxidative degradation method described in I. M. Kolthoff et al, J. Polym. Sci., 1, 429 (1948), and means the ratio in % of the amount of aromatic vinyl monomer units forming an aromatic vinyl monomer chain having a molecular weight of about 1,000 to the total amount of aromatic vinyl monomer units.

The block copolymer rubber has a number average molecular weight such that the lower limit thereof is 280,000 and preferably 300,000, and the upper limit thereof is 1,000,000, preferably 800,000 and more preferably 700,000. If the number average molecular weight is too small, the impact resistance is liable to be poor. In contrast, if the number average molecular weight is too large, the luster is liable to be poor.

The ratio (Mw/Mn) of weight average molecular weight (Mw) to number average molecular weight (Mn) in the block copolymer rubber is in the range of about 1.02 to 2, preferably about 1.05 to 1.3.

The block copolymer rubber has a solution viscosity as measured on a 5% solution in styrene such that the lower limit thereof is preferably 20 mPa·s and more preferably 23 mPa·s, and the upper limit thereof is preferably 200 mPa·s, more preferably 100 mPa·s and especially preferably 70 mPa·s. If the solution viscosity is too small, the impact resistance is insufficient and the luster tends to be greatly reduced. In contrast, if the solution viscosity is too large, the luster is insufficient and tends to vary within a shaped article.

The block copolymer rubber may contain monomer units other than the conjugated diene monomer units and the aromatic vinyl monomer units, provided that the effect of the invention is substantially obtained. The amount of such optional monomer is preferably not larger than 40% by weight, more preferably not larger than 30% by weight and especially preferably not larger than 15% by weight. As specific examples of the optional monomer, there can be mentioned non-conjugated diene monomers such as 1,5-hexadiene, 1,6-heptadiene, 1,7-octadiene, dicyclopentadiene and 5-ethylidene-2-norbornene; acrylic and methacrylic acid ester monomers such as methyl acrylate and methyl methacrylate; and α,β-ethylenically unsaturated nitrile monomers such as acrylonitrile, methacrylonitrile and α-chloroacrylonitrile.

Of the above-mentioned block copolymer rubbers, a block copolymer rubber having a block or blocks predominantly comprised of aromatic vinyl monomer units and a block or blocks predominantly comprised of butadiene units are preferable, A block copolymer rubber having a single block predominantly comprised of styrene units and a single block predominantly comprised of butadiene units, namely, a styrene-butadiene diblock copolymer rubber is especially preferable.

The process for producing the block copolymer rubber of the present invention is not particularly limited, and includes a process for polymerizing an aromatic vinyl monomer and a conjugated diene monomer, for example, by using an organic active metal compound as initiator in the presence of a polar compound such as a Lewis base in a hydrocarbon solvent. This polymerization process preferably comprises (a) a step of polymerizing a conjugated diene monomer alone, and (b) a subsequent step of polymerizing an aromatic vinyl monomer alone, and if desired, (c) a step of polymerizing a mixture of the conjugated diene monomer and the aromatic vinyl monomer, which intervenes, between the step (a) and the step (b).

As specific examples of the hydrocarbon solvent, there can be mentioned aliphatic hydrocarbons such as butane, pentane and hexane; alicyclic hydrocarbons such as cyclopentane and cyclohexane; and aromatic hydrocarbons such as benzene, toluene and xylene. These hydrocarbon solvents may be used either alone or as a combination of at least two thereof.

The organic active metal compound includes, for example, those which are capable of being anion-polymerized, such as organic alkali metal compounds and organic alkaline earth metal compounds. Of these, organic alkali metal compounds are preferable in view of high polymerization reactivity and low material cost. As specific examples of the organic alkali metal compound, there can be mentioned monofunctional organolithium compounds such as n-butyllithium, sec-butyllithium, t-butyllithium, hexyllithium, phenyllithium and stilbenelithium; polyfunctional organolithium compounds such as dilithiomethane, 1,4-dilithlobutane, 1,4-dilithio-2-ethylcyclohexane and 1,3, 5-trilithiobenzene; and sodium naphthalene and potassium naphthalene. Of the organic alkali metal compounds, organolithium compounds are preferable. Monofunctional organolithium compounds are especially preferable. As specific examples of the organic alkaline earth metal compound, there can be mentioned n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium. These organic active metal compounds may be used either alone or as a mixture of at least two thereof, The amount of the organic active metal compound used is appropriately chosen depending upon the desired molecular weight of the block copolymer rubber, but is in the range of about 0.1 to 10 m-mol and preferably about 0.2 to 2 m-mol, per 100 g of the total monomers.

As specific examples of the polar compound, there can be mentioned ethers such as tetrahydrofuran, diethyl, ether, dioxane, ethylene glycol dimethyl ether, ethylene glycol dibutyl ether, diethylene glycol dimethyl ether and diethylene glycol dibutyl ether; tertiary amines such as tetramethylethylenediamine, trimethylamine, triethylamine, pyridine and quinuoridine; alkali metal alkoxides such as potassium t-amyloxide and potassium t-butoxide; and phosphines such as triphenylphosphine. These polar compounds may be used either alone or as a combination of at least two thereof.

The amount of the polar compound used is appropriately chosen so as to give a block copolymer rubber having the desired vinyl bond content, although the amount thereof varies depending upon the kind of polar compound and the polymerization temperature. For example, when tetamethylethylenediamine is used, its amount is in the range of about 0.5 to 20 mol, preferably about 1 to 10 mol, per mol of an organic active metal compound used as initiator. When the amount of the polar compound is too small or too large, a block copolymer rubber having the desired high vinyl bond content is difficult to obtain.

[Modifier for Resin]

The modifier for resin of the present invention comprises the above-mentioned block copolymer rubber, and is useful as an impact-resistance modifier or a toughening agent. The modifier for resin may contain other ingredients such as rubber other than the above-mentioned block copolymer rubber, and additives conventionally used In a resin industry, provided that the effect of the present invention can be substantially obtained.

As specific examples of the rubber other than the above-mentioned block copolymer rubber, there can be mentioned a conjugated diene polymer rubber represented by polybutadiene, and an aromatic vinyl-conjugated diene copolymer rubber other than the above-mentioned block copolymer rubber. The additive includes, for example, mineral oil and liquid paraffin. When a resin-forming monomer such as styrene is polymerized in the presence of the modifier for resin, the ingredient to be incorporated in the modifier for resin is preferably appropriately chosen from those which give no baneful influence upon the polymerization reaction.

[Resin Composition]

The resin composition of the present invention comprises 2 to 25% by weight of the above-mentioned block copolymer rubber and 98b to 75% by weight of a resin.

The resin used is not particularly limited, and includes, for example, general thermoplastic resins such as aromatic vinyl resins and olefin resins, engineering plastics, and thermoplastic resins. Of these, aromatic vinyl resins are preferably used.

As specific examples of the aromatic vinyl resins, there can be mentioned an acrylonitrile-acrylate-styrene copolymer resin, an acrylonitrile-ethylene-styrene copolymer resin, an acrylonitrile-styrene copolymer resin, an acrylonitrile-butadiene-styrene copolymer resin, a polystyrene resin, a high-impact polystyrene resin and a methyl methacrylate-styrene copolymer resin. Of these, a polystyrene resin is beneficially used. As specific examples of the olefin resins, there can be mentioned polyethylene and polypropylene. As examples of the engineering plastics, there can be mentioned polyphenylene ether, polyamide, polycarbonate, polyacetal and polyester. These resins may be used either alone or as a combination of at least two thereof.

The amount of the above-mentioned block copolymer rubber in the resin composition of the present invention is such that the lower limit thereof is 2% by weight, preferably 3% by weight and especially preferably 5% by weight, and the upper limit thereof is 25% by weight, preferably 20% by weight and especially preferably 15% by weight. The amount of the resin in the resin composition of the present invention is such that the lower limit thereof is 75% by weight, preferably 80% by weight and especially preferably 85% by weight, and the upper limit thereof is 98% by weights preferably 97% by weight and especially preferably 95% by weight. If the amount of the block copolymer rubber is too small, the impact resistance is poor. In contrast, if the amount of the block copolymer rubber is too large, the luster, rigidity, weather resistance and hardness are liable to be poor.

If desired, ingredients conventionally used in a resin industry can be incorporated in the resin composition of the present invention. The ingredients include, for example, mineral oil, liquid paraffin, organic and inorganic fillers, a stabilizer, a plasticizer, a lubricant, an ultraviolet absorber, a colorant, a release agent, an antistatic agent and a fire retardant. The amount of the ingredient used is appropriately chosen within a range such that the effect of the present invention is substantially obtained.

The process for producing the resin composition of the present invention is not particularly limited. A resin and the block copolymer can be mechanically mixed together. Alternatively, a resin-forming monomer can be polymerized in the presence of the block copolymer rubber. The latter process is preferable because a resin composition having excellent impact resistance is easily obtained.

The method of mechanically mixing a resin with the block copolymer can be carried out in a conventional manner by using a mixing or kneading means such as a single or twin screw extruder, a Banbury mixer, a roll or a kneader. The mixing temperature is preferably in the range of 100 to 250° C. In this mechanically mixing method, a thermoplastic resin is used.

In the method of polymerizing a resin-forming monomer in the presence of the block copolymer rubber, the block copolymer rubber is dissolved or dispersed in the resin-forming monomer to prepare a monomer liquid for polymerization, and then, the monomer liquid is polymerized by an appropriate procedure such as bulk, suspension, solution or emulsion polymerization procedure. Especially when an aromatic vinyl monomer is polymerized in the presence of the block copolymer rubber, an aromatic vinyl resin composition having an excellent impact resistance can be obtained.

In the bulk polymerization procedure, the block copolymer rubber is dissolved or dispersed in a resin-forming monomer, and, if desired, a molecular weight modifier, a lubricant and other ingredient are incorporated in the solution or dispersion, and further, an initiator is added therein to conduct a bulk polymerization in an inert gas atmosphere with stirring. When an aromatic vinyl monomer is polymerized by the bulk polymerization procedure, the polymerization temperature is preferably in the range of 60 to 200° C. In the suspension polymerization procedure, the block copolymer rubber is dissolved in a resin-forming monomer in a manner similar to the bulk polymerization procedure, and, if desired, a molecular weight modifier, a lubricant and other ingredient are incorporated and further an initiator is added in the solution, and then, the solution is dispersed in an aqueous solution containing a suspension stabilizer where a polymerization is carried out while a suspension state is maintained. After completion of the suspension polymerization, the suspension stabilizer is thoroughly removed by washing with water to recover a resin composition. When an aromatic vinyl monomer is polymerized by the suspension polymerization procedure, the polymerization temperature is preferably in the range of 60 to 150° C.

In the solution polymerization procedure, the block copolymer rubber is dissolved in a resin-forming monomer in a manner similar to the bulk polymerization procedure, and, if desired, a molecular weight modifier, a lubricant, an organic solvent for viscosity control and other ingredient are incorporated and further an initiator is added in the solution to conduct a polymerization in an inert gas atmosphere with stirring. When an aromatic vinyl monomer is polymerized by the solution polymerization procedure, the polymerization temperature is preferably in the range of 60 to 200° C. A two stage polymerization procedure can be employed wherein a bulk polymerization is carried out in the first stage until 10 to 50% by weight of a resin-forming monomer is polymerized, and then, a suspension or solution polymerization is carried out in the second stage.

The resin composition of the present invention is preferably thermoplastic, and preferably has a melt flow rate of at least 0.1 g/10 min, more preferably 0.5 to 20 g/10 min as measured at 200° C. under a load of 5 kg according to JIS K6871. If the melt flow rate is too small or too large, kneading becomes difficult and the dispersion of block copolymer rubber in the resin becomes non-uniform, and thus, the modifying effect of the present invention tends to be insufficient.

The invention will now be described more specifically by the following examples and comparative examples.

The physical properties were evaluated by the following methods.

(1) Number Average Molecular Weight (Mn) of Block Copolymer Rubber

Mn of a block copolymer rubber was measured by gel permeation chromatography using tetrahydrofuran as solvent and expressed in terms of that of standard polystyrene. A high performance liquid chromatograph "HLC-8020" available from Tosoh Corporation was used. The column used was "G4000HXL" and "G5000HXL" (both are available from Tosoh Corporation) which were connected in series).

(2) Content of Styrene units and Content of Vinyl Bond in Butadiene Units

These contents were measured by a infrared spectrophotometer according to the Hampton method [R. Hampton, Anal. Chem., 21, 923(1949)].

(3) Ratio of Blocked Styrene

The ratio of blocked styrene was measured by the osmium oxidative degradation method described in I. M. Kolthoff et al, J. Polym. Sci., 1, 429 (1948). That is, 0.05 g of a block copolymer rubber was dissolved in 10-ml of carbon tetrachloride, and then, 16 ml of an aqueous 70% solution of tert-butyl hydrperoxide and 4 ml of a 0.05% solution of osmium tetraoxide in chloroform were added to the copolymer rubber solution. The mixture was refluxed at 90° C. for 15 minutes to conduct an oxidative degradation. The reaction mixture was cooled, and then, 200 ml of methanol was added thereto with stirring to precipitate a blocked styrene ingredient. The precipitate was filtered by a glass filter having pores with an average diameter of 5 $\mu$m. The filter cake was weighed. The ratio of blocked styrene was expressed by the ratio in % of the weight thereof to the total weight of the styrene monomer units.

(4) Izod Impact Strength

A test specimen was prepared by injection molding using an injection molding machine "SAV-30/30" available from Yamashiro Seiki K. K., at a mold temperature of 50° C. and a nozzle tip temperature of 240° C. Izod impact strength was measured at 25° C. according to JIS K7110.

(5) Luster

A square specimen having a size of 9 cm×5 cm×2 mm (thickness) was prepared by injection molding in the same manner as mentioned in (4). Luster was measured according to JIS Z8741 at an incidence angle of 60°. An injection port was located on a center straight line extending in the longitudinal direction and 1 cm apart from one side of 5 cm. A molten resin composition was injected through the injection port in a direction perpendicular to the major surface of specimen. Luster was measured on two points, i.e., in gate portion and end portion of the injection-molded specimen. The measuring point in gate portion and the measuring point in end portion were located on a center straight line extending in the longitudinal direction on the injection port side and 2 cm and 7 cm apart from the end of injection port side of specimen (namely, 1 cm and 6 cm apart from the injection port), respectively.

(6) Thermal Stability of Luster

Luster was measured on the specimen by the procedure mentioned in (5) according to JIS Z8741 before and after heat-treatment of the specimen. The thermal stability of luster was expressed by the ratio in % of the luster as measured after heat-treatment to the luster as measured before heat-treatment. The heat-treatment was carried out by placing a specimen on a stainless steel sheet covered with a polytetrafluoroethylene sheet, placing the assembly of specimen horizontally on a rotary disc in a forced hot air oven, and maintaining the specimen at 90° C. for 3 hours in the oven.

EXAMPLE 1

The inner atmosphere of a stainless steel reaction vessel was replaced with nitrogen, and the reaction vessel was charged with 7 kg of previously purified cyclohexane, 8.57 mmol of N,N,N',N'-tetramethylethylenediamine and 600 g of 1,3-butadiene. The content was heated to 50° C. and then 4.4 ml of a solution of n-butyllithium (1.65 mmol/ml) in hexane was added to initiate polymerization. Immediately after the commencement of polymerization, temperature was elevated to 60° C. at a rate of 0.5° C./min and the content was maintained at that temperature (first stage polymerization). When the polymerization conversion reached 100%, 400 g of styrene was added and the polymerization was continued. When the polymerization conversion of styrene reached 100%, the reaction mixture was cooled to 20° C. and 29.7 mmol of isopropyl alcohol was added to stop the polymerization. Then 2 g of a phenolic antioxidant ("Irganox 1076" available from Ciba-Geigy AG) was added and the reaction mixture was recovered. The reaction mixture was subjected to steam stripping to remove the solvent and then, vacuum-dried to give styrene-butadiene copolymer rubber 1. The properties of the copolymer rubber 1 are shown in Table 1.

10 parts by weight of styrene-butadiene copolymer rubber 1 was dissolved in 90 parts by weight of styrene monomer, and then 300 ppm of a chain transfer agent (n-dodecyl mercaptan) was added to the solution of copolymer rubber 1 to prepare a styrene resin-forming monomer liquid formulation.

A 4-liter reaction vessel was charged with 2,300 g of the styrene resin-forming monomer liquid formulation. Polymerization was carried out at 130° C. with thorough stirring until the solid content reached 45% by weight.

The polymerization mixture was taken out from the reaction vessel and cooled to 20° C. to give 625 g of a polymerization liquid. A 4-liter stainless steel reaction vessel was charged with 625 g of the polymerization liquid and 1,875 g of an aqueous 0.5 weight % solution of polyvinyl alcohol ("Gosenol GH-20" available from Nippon Synthetic Chem. Ind. Co.) as a dispersant. The content was heated to 70° C. while being stirred, and then, 1.25 g of benzoyl peroxide and 0.63 g of dicumyl peroxide as radical polymerization initiators were added to the content. Suspension polymerization was carried out at 70° C. for 1 hour, at 90° C. for 1 hour, at 110° C. for 1 hour and further at 130° C. for 4 hours. After completion of the polymerization, the polymerization mixture was cooled to 20° C., and then filtered to recover a polymer. The recovered polymer was washed with water, dehydrated, and then, vacuum-dried at 60° C. for 12 hours to give polystyrene resin composition A.

Polystyrene resin composition A was milled by a roll mill at 180° C. to prepare a sheet. The sheet was pelletized into pellets by a sheet-pelletizer. The pellets were injection-molded to prepare a test specimen. Izod impact strength, luster and stability of luster were measured. The results are shown in Table 1.

EXAMPLE 2

The inner atmosphere of a stainless steel reaction vessel was replaced with nitrogen, and the reaction vessel was charged with 7 kg of previously purified cyclohexane, 8.57 mmol of N,N,N',N'-tetramethylethylenediamine and 400 g of 1,3-butadiene. The content was heated to 50° C. and then 4.4 ml of a solution of n-butyllithium (1.65 mmol/ml) in hexane was added to initiate polymerization. Immediately after the commencement of polymerization, temperature was elevated to 60° C. at a rate of 0.5° C./min and the content was maintained at that temperature (first stage polymerization). When the polymerization conversion reached 100%, 200 g of 1,3-butadiene and 200 g of styrene were added and the polymerization was continued. When the polymerization conversion of the added 1,3-butadiene and styrene reached 100%, the reaction mixture was cooled to 20° C., The polymerization mixture was treated by the same procedures as in Example 1 to give styrene-butadiene copolymer rubber 2. The properties of the copolymer rubber 2 are shown in Table 1.

By the same procedures as in Example 1, polystyrene resin composition B was prepared wherein styrene-butadiene copolymer rubber 2 was used instead of styrene-butadiene copolymer rubber 1 with all other conditions remaining the same. The properties of polystyrene resin composition B are shown in Table 1.

EXAMPLE 3

By the same procedures as in Example 1, styrene-butadiene copolymer rubber 3 was prepared wherein the amount of N,N,N',N'-tetramethylethylenediamine was changed to 4.15 mmol, the amount of butadiene was changed to 700 g and the amount of styrene was changed to 300 g. All other conditions remained the same. The properties of the copolymer rubber 3 are shown in Table 1.

By the same procedures as in Example 1. polystyrene resin composition C was prepared wherein styrene-butadiene copolymer rubber 3 was used instead of styrene-butadiene copolymer rubber 1 with all other conditions remaining the same. The properties of polystyrene resin composition C are shown in Table 1.

TABLE 1

|  | Example | | | Comp. Example | |
| --- | --- | --- | --- | --- | --- |
|  | 1 | 2 | 3 | 1 | 2 |
| Copolymer rubber | 1 | 2 | 3 | — | 4 |
| Number average molecular weight (×10,000) | 32 | 31 | 33 | — | 30 |
| Viscosity of 5% styrene solution (mPa · s) | 26 | 24 | 25 | — | 33 |
| Content of 1,3-butadiene units (wt. %) | 60 | 60 | 70 | — | 60 |
| Content of vinyl bond (wt. %) | 71 | 72 | 56 | — | 10 |
| Content of styrene units (wt. %) | 40 | 40 | 30 | — | 40 |
| Ratio of blocked styrene (%) | 98 | 81 | 98 | — | 98 |
| Polystyrene resin composition | A | B | C | PS*$_1$ | D |
| Izod impact strength (kJ/m$^2$) | 3.1 | 3.2 | 3.4 | 1.8 | 3.4 |
| Luster at end portion (%) | 94 | 94 | 93 | 125 | 90 |
| Luster at gate portion (%) | 90 | 90 | 88 | 123 | 84 |
| Luster at end portion after heat-treatment (%) | 93 | 93 | 91 | 124 | 87 |
| Luster retention at end portion after heat-treatment (%) | 99 | 99 | 98 | 99 | 97 |

PS*$_1$: Polystyrene

Comparative Example 1

A styrene resin-forming monomer liquid formulation containing 300 ppm of a chain transfer agent (n-dodecyl mercaptan) was prepared in the same manner as in Example 1 wherein styrene-butadiene copolymer rubber 1 was not used. By the same procedures as in Example 1, suspension polymerization of the styrene resin-forming monomer liquid formulation was carried out to give polystyrene resin. The properties of the polystyrene resin are shown in Table 1.

Comparative Example 2

By the same procedures as in Example 1, styrene-butadiene copolymer rubber 4 was prepared wherein N,N,N',N'-tetramethylethylenediamine was not used, and the amount of a solution of n-butyllithium (1.65 mmol/ml) in hexane was changed to 4.5 ml with all other conditions remaining the same. The properties of the copolymer rubber 4 are shown in Table 1.

By the same procedures as in Example 1, polystyrene resin composition D was prepared wherein styrene-butadiene copolymer rubber 4 was used instead of styrene-butadiene copolymer rubber 1 with all other conditions remaining the same. The properties of polystyrene resin composition D are shown in Table 1.

As seen from the results shown in Table 1, the resin composition of the present invention has good impact resistance and thermal stability of luster, and is characterized in that the luster varies only to a minimized extent within a shaped article. In contrast, polystyrene resin not containing the styrene-butadiene block copolymer rubber as a modifier has very poor impact resistance (Comparative Example 1). Even if a styrene-butadiene block copolymer rubber is used, when the content of vinyl bond in butadiene units is too small, the luster is insufficient, the reduction of luster after heat-treatment is greatly large, and an injection-molded article exhibits large variation in luster within the article (Comparative Example 2).

INDUSTRIAL APPLICABILITY

The resin composition of the present invention has good and well-balanced impact resistance and luster, and is characterized in that the luster is thermally stable and the luster of an injection molded article varies only to a minimized extent within the molded article. Therefore, the resin composition of the present invention is useful for electric appliances, business machines, packaging containers, miscellaneous goods and other articles.

What is claimed is:

1. An aromatic vinyl-conjugated diene block copolymer rubber comprising 50 to 75% by weight conjugated diene monomer units and 25 to 50% by weight of aromatic vinyl monomer units, wherein the content of vinyl bond in the conjugated diene monomer units is 55 to 90% by weight, the ratio of blocked aromatic vinyl is at least 70% and the number average molecular weight of the copolymer rubber is in the range of 280,000 to 1,000,000.

2. The block copolymer rubber according to claim 1, which comprises 55 to 65% by weight of conjugated diene monomer units and 35 to 45% by weight of aromatic vinyl monomer units.

3. The block copolymer rubber according to claim 1, which has a solution viscosity in the range of 20 to 200 cps as measured on a 5% solution in styrene.

4. The block copolymer rubber according to claim 1, wherein the ratio of blocked aromatic vinyl is at least 80%.

5. The block copolymer rubber according to claim 1, wherein the conjugated diene monomer is butadiene and the aromatic vinyl monomer is styrene.

6. A modifier for resin which comprises a block copolymer rubber as claimed in claim 1.

7. A resin composition comprising 2 to 25% by weight of a block copolymer rubber as claimed in claim 1, and 98 to 75% by weight of a resin.

8. The resin composition according to claim 7, wherein the resin is thermoplastic.

9. The resin composition according to claim 8, wherein the resin is an aromatic vinyl resin.

10. A process for producing a resin composition characterized by polymerizing a monomer for forming a resin in the presence of a block copolymer rubber as claimed in claim 1.

11. The process for producing a resin composition according to claim 10, wherein the monomer for forming a resin is an aromatic vinyl monomer.

* * * * *